2,718,469

PROCESS FOR MAKING MAPLE SIRUP

Roderick K. Eskew, Glenside, and Joseph B. Claffey, Philadelphia, Pa., assignors to the United States of America as represented by the Secretary of Agriculture No Drawing. Application January 22, 1953, Serial No. 332,783

3 Claims. (Cl. 99—142)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to the production of high-grade maple sirup.

An object of this invention is to provide a process for making maple sirup of fancy grade, light color and desirable flavor. Another object is to provide a process which yields maple sirup of uniform high quality regardless of variations in the source and composition of the sap used.

We have discovered that a substantially colorless maple sirup, devoid of maple flavor, can be prepared by concentration of the sap at atmospheric pressure provided the evaporation is fast and the period during which the product is at a high temperature is kept sufficiently short. Furthermore, since it is known that most of the color and flavor of maple sirup made by the conventional kettle or pan boiling is produced after a concentration of about 30% is reached, we can concentrate sap in the conventional way to about 30% solids (20 to 40° Brix) and then complete the concentration by our process and thereby obtain a sirup of light color and bland flavor. Finally, we have discovered that the light colored sirups having little or no maple flavor develop the optimum color and a full-bodied maple flavor when heated at or near the atmospheric boiling point for a suitable period of time.

Commercial maple sirup is graded primarily on the basis of color. A convenient quantitative measure of color is what is called the color index, defined by the equation $$CI = A\frac{86.3}{bc}$$

where $CI$=color index, $A$=absorbance of light at 450 mu wave length, $b$=cell length in centimeters and $c$=concentration of the sample in grams per 100 ml. of solution. It has been found that sirup of most desirable color has $CI$=0.5 or thereabouts.

Although the prior art teaches that in order to make maple sirup having little or no color it is essential that concentration of the sap be conducted at low temperature, as by vacuum evaporation or freeze dehydration, we are able to make such sirup by high temperature evaporation at atmospheric pressure by keeping very short the time of exposure to the high temperature. This is achieved by heating the sap very quickly to about its atmospheric boiling point and then concentrating it by an almost instantaneous evaporation of the excess water. Since the sap and sirup are exposed to high temperature only a few seconds, there is negligible development of color and flavor during this evaporation.

The following examples illustrate the practice of our invention.

Example I

Maple sap with a sugar content of 1.8% and a color index of 0.25 is pumped at the rate of 7.1 gallons per hour through a stainless steel tube 0.18 inch inside diameter and 15 feet long. Steam pressure of approximately 6 p. s. i. g. is used on the jacket surrounding the tube so as to heat the sap when under 5.5 p. s. i. g. to about 230° F.

The preheated sap passes to a stainless steel jacketed tube 0.62 inch inside diameter and 12 feet, 9 inches long wherein steam at approximately 40 pounds p. s. i. g. is applied to the jacket in order to vaporize sufficient water to concentrate the sap to 65.5% sugar. The mixture of resulting sirup and vapor which emerges from the evaporator tube enters a conventional liquid-vapor separator from which the vapors escape to the atmosphere. The sirup which will now have a color index of about .28 and which will have almost no maple flavor then passes to a holding chamber kept at 219° F. for 27 minutes to develop color and flavor. The "sugar sand" is filtered from the sirup in the conventional manner. The resulting product will then have a color index of approximately 0.5 and a true maple flavor.

One of the advantages of our process will be apparent when it is realized that when the sap used in the foregoing example was converted to maple sirup under the most favorable conditions characteristic of the conventional process of boiling at atmospheric pressure, the color index of the resulting sirup was 1.04. This is somewhat poorer than "medium amber" and such a product would sell at a discount. Thus our process will produce a high-grade sirup from a sap which, by the conventional method, would yield only an inferior product.

In the foregoing example, although the evaporation was done at atmospheric pressure, the color and flavor developed were negligible, for the total time to heat and concentrate was approximately 10 seconds. This contrasts with the conventional method which requires 110 or more minutes for heating and concentrating. Thus in our process the conditions of concentrating are made such that variations in the sugar content of the sap cause no significant variation in the color of the resulting sirup. This is a great improvement over the conventional process for in the latter the time required to convert a sap of 1% sugar to sirup would be approximately 3 times as long as to make sirup from a sap containing 3% sugar and hence the weaker sap would result in a darker sirup.

It is known that the rate of development of color in the course of concentrating sap to sirup is greater at concentrations above about 30% than at concentrations below this point. Thus in order to reduce the bulk of the sap to be hauled to the point of sirup making and also to partially stabilize the sap it could be partially concentrated on the farm to about 30% solids by conventional procedures. At this low concentration even impure sap would still have a sufficiently light color to permit the final concentration to 65.5% sugars to be made by our process and still obtain a "fancy" grade sirup. The following is an example of how this alternate procedure could be carried out.

Example II

Maple sap with a sugar content of approximately 2% is boiled in an open pan by methods familiar to those skilled in the art until the sugar concentration is 30%. At this point the color index is about 0.31. This product is then fed at the rate of 5.95 gallons per hour by a positive delivery pump into a stainless steel jacketed tube of 0.104 inch inside diameter and 5 feet long. Steam at approximately 15 p. s. i. g. is used in the jacket to bring the temperature of the emerging liquid to approximately 216° F. This preheated dilute sirup then passes to a steam jacketed stainless steel tube of 0.444 inch inside diameter and 4½ feet long. Steam at approximately 40 p. s. i. g. is applied to the jacket so that sufficient water is vaporized for the sirup to emerge from the vaporizing tube at 65.5° Brix. The vapor liquid mixture passes to a conventional vapor liquid separator from which the vapors are lost to the atmosphere. The sirup so made has a color index of approximately 0.32. The desired flavor and sufficient additional color to bring the color index to 0.5 is achieved by holding the sirup at 219° F. for 23 minutes. The "sugar sand" is then removed by filtration in the conventional way. The resulting product is a fancy grade and has a good maple flavor.

Having thus described our process, we claim:

1. A process for producing maple sirup, comprising concentrating the sap to sirup by passing it once rapidly at atmospheric pressure through an externally heated tubular heater while controlling the heat supplied to the heater so as to cause the sap to be concentrated to sirup density during such single passage, followed by holding the sirup at a temperature approximating, but never exceeding its atmospheric boiling point for the time necessary to develop the desired color and flavor.

2. A process for producing maple sirup from sap which has already been partially concentrated in an open evaporator, comprising concentrating such partially concentrated sap to sirup by passing it once rapidly at atmospheric pressure through an externally heated tubular heater while controlling the heat supplied to the heater so as to cause the sap to be concentrated to sirup density during such single passage, followed by holding the sirup at a temperature approximating but never exceeding its atmospheric boiling point for the time necessary to develop the desired color and flavor.

3. A process for producing maple sirup from sap which has already been concentrated in an open evaporator to between 20° and 40° Brix, comprising concentrating such partially concentrated sap to sirup by passing it once rapidly at atmospheric pressure through an externally heated tubular heater while controlling the heat supplied to the heater so as to cause the sap to be concentrated to sirup density during such single passage followed by holding the sirup at a temperature approximating but never exceeding its atmospheric boiling point for the time necessary to develop the desired color and flavor.

References Cited in the file of this patent

UNITED STATES PATENTS

| | | |
|---|---|---|
| 2,054,873 | Whitby | Sept. 22, 1936 |
| 2,549,877 | Willits et al. | Apr. 24, 1951 |